United States Patent [19]
Wallace et al.

[11] Patent Number: 5,769,581
[45] Date of Patent: Jun. 23, 1998

[54] DIRECT TENSION INDICATING WASHERS

[75] Inventors: Ivan Wayne Wallace, Ludlow, Vt.; John A. Herr, West Chesterfield, N.H.

[73] Assignee: Applied Bolting Technology Products, Inc., Ludlow, Vt.

[21] Appl. No.: 804,217

[22] Filed: Feb. 21, 1997

[51] Int. Cl.$^6$ .............................. F16B 31/02; G01L 5/00
[52] U.S. Cl. ................................ 411/10; 411/13; 411/14; 116/212; 116/DIG. 34
[58] Field of Search .................................. 411/3–5, 9–11, 411/13, 14; 116/212, DIG. 34

[56] References Cited

U.S. PATENT DOCUMENTS

| | | |
|---|---|---|
| 2,476,561 | 7/1949 | Pedersen . |
| 2,781,687 | 2/1957 | Knocke . |
| 2,850,937 | 9/1958 | Ralston . |
| 3,304,827 | 2/1967 | Bush ............................................ 411/13 |
| 3,476,009 | 11/1969 | Markey ...................................... 411/11 |
| 3,948,141 | 4/1976 | Shinjo . |
| 4,020,734 | 5/1977 | Bell . |
| 4,072,081 | 2/1978 | Curtis et al. . |
| 4,149,446 | 4/1979 | Spengler et al. . |
| 4,322,193 | 3/1982 | Stahl ......................................... 411/11 |
| 4,347,024 | 8/1982 | Coldren . |
| 5,015,132 | 5/1991 | Turner et al. ............................. 411/10 |
| 5,370,483 | 12/1994 | Hood et al. ............................... 411/10 |

FOREIGN PATENT DOCUMENTS

| | | |
|---|---|---|
| 50-85836 | 7/1975 | Japan . |
| 1184033 | 3/1970 | United Kingdom ..................... 411/14 |

*Primary Examiner*—Neill R. Wilson
*Attorney, Agent, or Firm*—Fishman, Dionne, Cantor & Colburn

[57] ABSTRACT

A direct tension indicating and maintaining washer has a first surface having at least one protuberance formed thereon and a second surface having at least one indentation formed therein opposite the protuberance. The inner diameter of the direct tension indicating and maintaining washer has an inner diameter wall meeting the second surface at an inner diameter edge. The outer diameter has an outer diameter wall meeting the second surface at an outer diameter edge. The inner diameter edge and the outer diameter edge lie in different planes. This causes the flattened direct tension indicating and maintaining washer to exert force against a bolt and maintain bolt tension. An alternative direct tension indicating and maintaining washer includes indicating material positioned in the indentation and a channel formed in the second surface leading from the indentation to the outside diameter of the direct tension indicating washer.

4 Claims, 8 Drawing Sheets

DIRECT TENSION INDICATING WASHERS

BACKGROUND OF THE INVENTION

1. Field of the Invention

The invention relates in general to direct tension indicating and maintaining washers and in particular to direct tension indicating and maintaining washers that maintain bolt tension and/or indicate when the proper bolt tension has been achieved.

2. Prior Art

High strength metal bolts, along with their corresponding nuts, when used in metal connections, are almost always intended to be installed so that they are "tensioned". The "tensioning" is usually accomplished by turning the nut relative to the bolt a specified amount of rotation or until a certain torque resistance has been reached. The tension in the bolt stretches the bolt and compresses the connection plates between the bolt head and nut so the connection plates do not slip relative to each other. It is this slip resistance which holds structures such as bridges and buildings together.

FIG. 1 is a top view of a conventional direct tension indicating washer 10, commonly referred to as a DTI. The direct tension indicating washer 10 includes a series of protuberances 12 formed on a first surface 14. As shown in FIG. 2, corresponding indentations 16 are formed in a second surface 18 of the direct tension indicating washer 10. As shown in FIGS. 3 and 4, the direct tension indicating washer 10 is manufactured through a stamping operation in which the blank metal washer 10 is placed between a tool 20 and a die 22. Pressure is applied to the tool 20 (e.g. by a press) and a protrusion 24 on the tool 20 creates the protuberance 12, and the corresponding indentation 16, in the direct tension indicating washer 10 as shown in FIG. 4.

The DTI is manufactured so that when the tightening of the bolt forces the protrusions 12 to compress, or reduce height, sufficiently, the bolt is said to have sufficient tension to meet code requirements. Determination of "sufficient" protrusion compression is accomplished in the field by the attempt to insert a feeler gage of specified thickness (e.g. 0.015") into the residual gap between the underside of the bolt head and the first surface 14 of the DTI. FIG. 1A shows a feeler gage being placed on a first surface of a direct tension indicating to test bolt tension (the bolt is not shown for clarity). If the attempt to insert the feeler gage is unsuccessful, that is, the inspector cannot insert the feeler gage into the gap half way radially around the DTI circumference between the DTI protuberances, the residual DTI gap (the space between the first surface of the direct tension indicating washer and the bottom of the bolt head) is said to be, on average, of dimension less than the thickness of the feeler gage, and is therefore judged acceptable. Conventional direct tension indicating washers are manufactured so that surfaces 14 and 18 are parallel and perpendicular to the longitudinal axis of the bolt which they are made to fit on, that is when the bolt is inserted through the inner diameter.

Conventional direct tension indicating washers, though well suited for their intended purposes, have several drawbacks. First, the process of attempting to insert the feeler gage into the DTI gap is time consuming and must be done after the bolt installer has stopped the tightening process. Second, over time, bolt tension declines as the bolt/nut threads seat into the mating steel surfaces and as external loads shake the connections and try to pry the bolt/nut apart. This problem is especially prominent in connections that are subject to vibration such as bridges, structures subject to earthquakes, connections supporting moving cranes and other equipment, etc. As the bolt tension declines, so does the clamping force and the capacity to carry external loads by resistance to slip. The conventional direct tension indicating washer 10 is flat and has the disadvantage that, after bolt installation, the protrusions 12 are essentially flattened in elastically and will not spring back to their original positions if the bolt begins to loose tension.

SUMMARY OF THE INVENTION

The above-discussed and other drawbacks and deficiencies of the prior art are overcome or alleviated by the direct tension indicating and maintaining washers of the present invention. The direct tension indicating and maintaining washer has a first surface having at least one protuberance formed thereon and a second surface having at least one indentation formed therein opposite the protuberance. The inner diameter of the direct tension indicating and maintaining washer has an inner diameter wall meeting the second surface at an inner diameter edge. The outer diameter has an outer diameter wall meeting the second surface at an outer diameter edge. The inner diameter edge and the outer diameter edge lie in different planes. This causes the flattened direct tension indicating and maintaining washer to exert force against a bolt and maintain bolt tension even when bolt elongation decreases. An alternative direct tension indicating washer includes extrudable indicating material positioned in an indentation and a channel formed in the second surface leading from the indentation to the outside diameter of the direct tension indicating and maintaining washer.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 5:
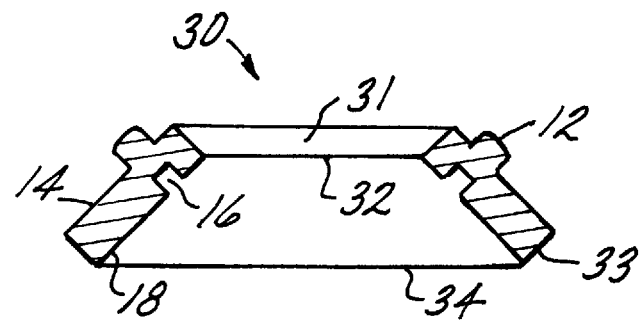
FIG. 5 is a cross-sectional view of a direct tension indicating and maintaining washer in accordance with a first embodiment of the invention.

FIG. 5 is a cross-sectional view of the direct tension indicating and maintaining washer of the present invention shown generally at 30. The direct tension indicating and maintaining washer is similar to the conventional washer shown in FIG. 1 in that a first surface 14 includes protuberances 12 and the second surface 18 includes indentations 16. The direct tension indicating and maintaining washer 30 has an opening formed therein having an inner diameter wall 31. The inner diameter wall 31 meets the second surface 18 at an inner diameter edge 32. The direct tension indicating and maintaining washer 30 has an outer diameter having an outer diameter wall 33. The outer diameter wall 33 meets the second surface 18 at outer diameter edge 34. The inner diameter edge 32 lies in a plane different from the plane of the outer diameter edge 34. In the exemplary embodiment shown in FIG. 5, the direct tension indicating and maintaining washer 30 has a conical cross section. It is understood that other geometries may be used.

Figure 3:
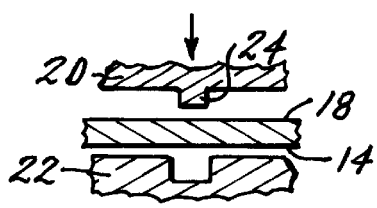
FIGS. 3 and 4 illustrate a process for creating the protuberances/indentations in the conventional direct tension indicating and maintaining washer.
Figure 4:
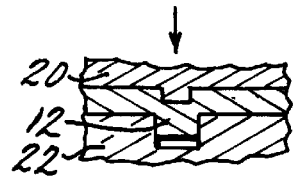
Figure 6:
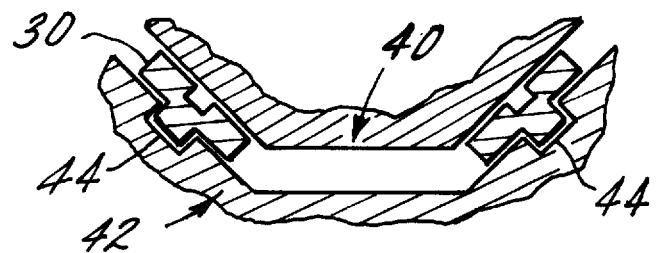
FIG. 6 illustrates a process for forming the direct tension indicating and maintaining washer shown in FIG. 5.

FIG. 6 illustrates a step in the process of making the direct tension indicating and maintaining washer 30. First, the protuberances 12 and indentations 16 are formed as described above with respect to FIGS. 3 and 4. Second, the direct tension indicating and maintaining washer 30 is placed between a second tool 40 and a second die 42. The second die includes recess 44 for receiving the protuberances 12 formed on the first surface of the direct tension indicating and maintaining washer 30. Pressure is applied to the tool 40 and the direct tension indicating and maintaining washer is formed into the conical shape shown in FIG. 5.

Although FIG. 6 illustrates a metal stamping manufacturing process, there are other processes, such as metal machining or metal casting, may be used to form the direct tension indicating and maintaining washer 30. In all cases, the metal product will be heat treated by quenching and tempering after forming to produce the required spring-like load/deformation properties. In an exemplary embodiment, the direct tension indicating and maintaining washer 30 is made from carbon steel, but stainless steel and other alloy products and non ferrous metals may also be used.

Figure 7:
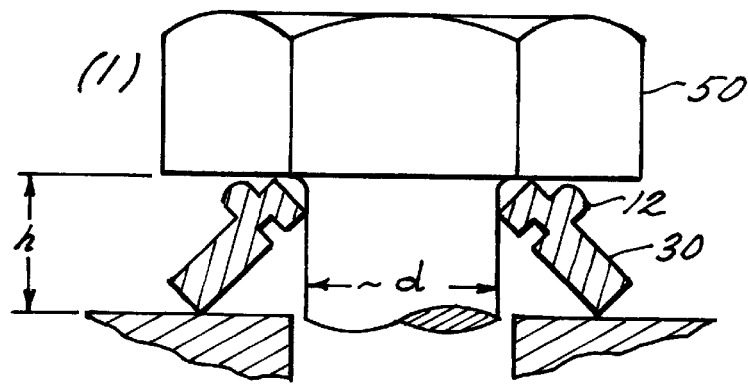
FIGS. 7–9 illustrate the state of the direct tension indicating and maintaining washer during the installation process.
Figure 8:
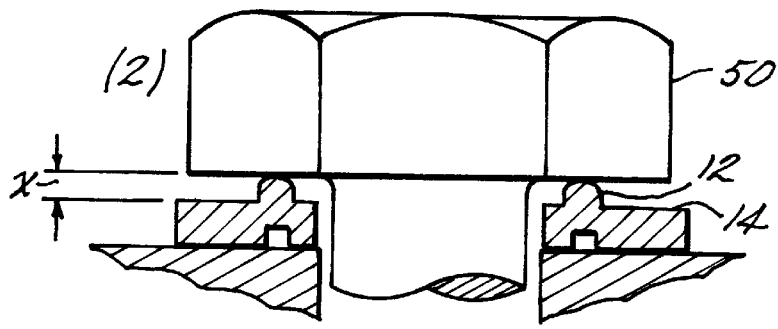
Figure 9:
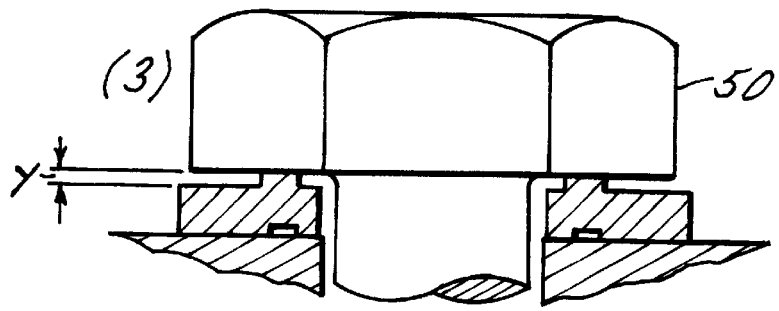

FIGS. 7–9 illustrate the state of the direct tension indicating and maintaining washer 30 during the installation process. FIG. 7 illustrates the placement of the direct tension indicating and maintaining washer 30 adjacent to a bolt head 50 which is threaded to a nut 52 (shown in FIG. 10). The conditions shown in FIG. 7 are identified as stage 1 where the bolt is at rest. As the bolt 50 is tightened by turning its nut 52, the direct tension indicating and maintaining washer 30 is flattened as shown in FIG. 8. At this state, identified as stage 2, the protuberances 12 on the first surface 14 of the direct tension indicating and maintaining washer 30 have not been fully compressed. The DTI gap, the distance between the first surface 14 and the bottom of the bolt head, is designated as "x." Although the direct tension indicating and maintaining washer 30 has been flattened so that the inner diameter edge and the outer diameter edge lie in the same plane, the direct tension indicating and maintaining washer 30 maintains its resiliency and will tend to return to its original conical shape when the bolt tension is released. As the bolt 50 is further tightened, the protuberances 12 are compressed and tightening is discontinued when the DTI gap is at or below a predetermined distance "y." At this point, the bolt installer knows that the bolt tension is equal to or greater than the required minimum. This state is identified as stage 3 and is shown in FIG. 9. The tension may now be tested with a feeler gage as shown in FIG. 1A.

Figure 10:
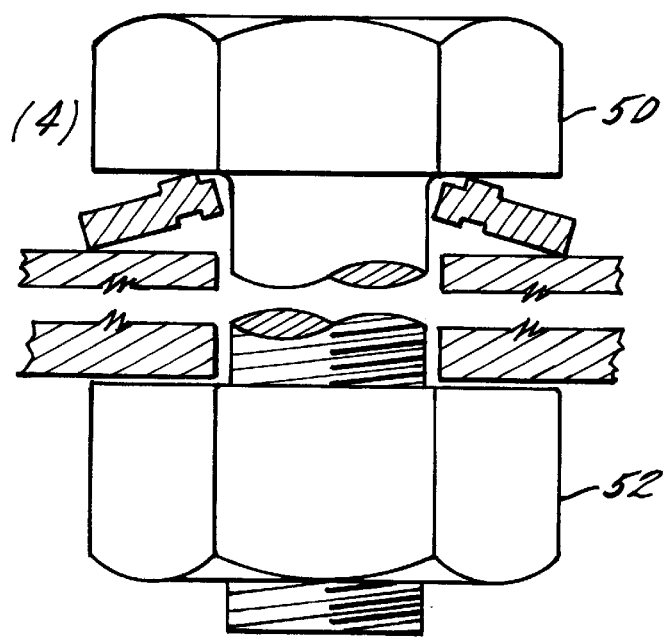
FIG. 10 illustrates the state of the direct tension indicating and maintaining washer after a decrease in bolt elongation.

FIG. 10 illustrates the state of the direct tension indicating and maintaining washer 30 as external loads, metal to metal deformation, or "seating in" of the bolt, vibration, temperature and other influences cause the bolt to tend to lose elongation. As shown in FIG. 10, the direct tension indicating and maintaining washer 30, due to its resilient nature, pushes against the bottom of the bolt 50 and maintains tension on the bolt. Accordingly, the direct tension indicating and maintaining washer 30 not only indicates when a predetermined bolt tension has been achieved upon bolt installation but maintains bolt tension even as the bolt tension would tend to decline during the life of the bolt/nut assembly.

Figure 1:
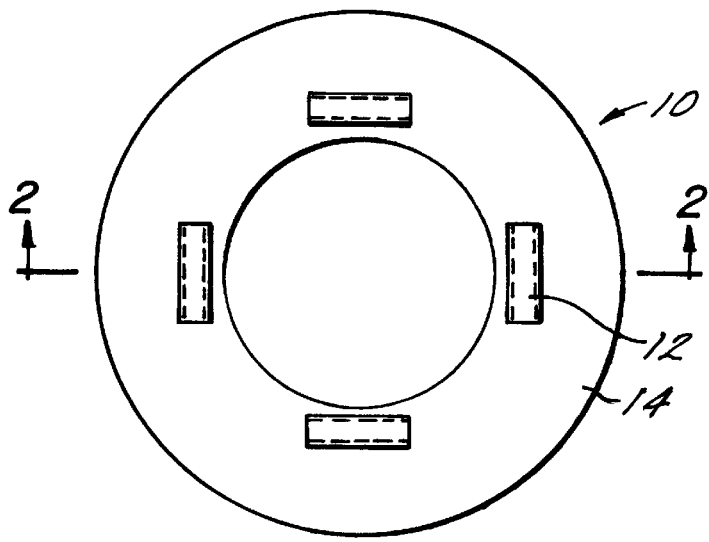
FIG. 1 is a top view of a conventional direct tension indicating and maintaining washer.
Figure 1A:
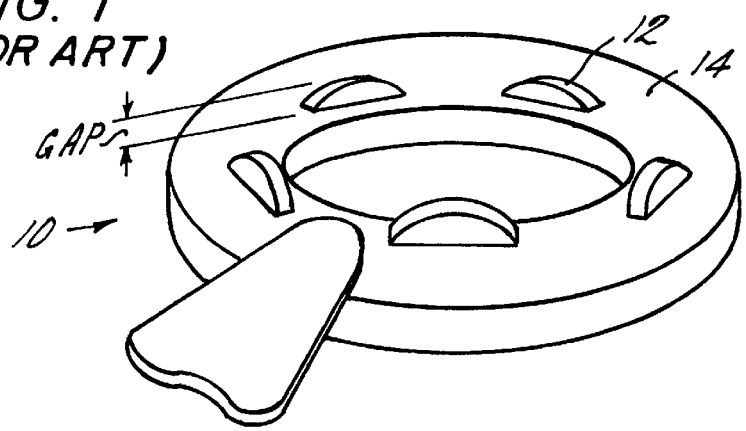
FIG. 1A is a perspective view of the use of a feeler gage to test bolt tension.
Figure 2:
FIG. 2 is a cross-sectional view of the direct tension indicating and maintaining washer shown in FIG. 1 taken along line 2—2.
Figure 11:
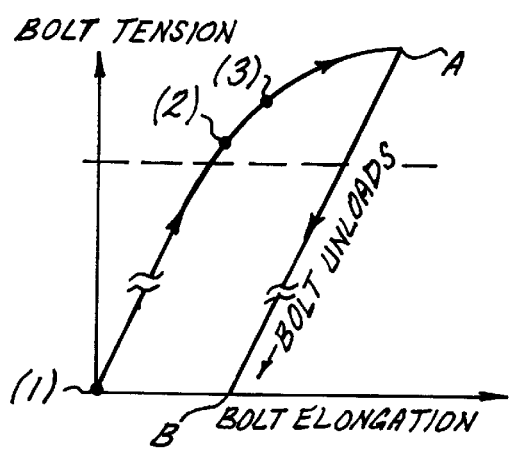
FIG. 11 is a graph of bolt tension versus bolt elongation when using the conventional direct tension indicating and maintaining washer shown in FIGS. 1–2.
Figure 12:
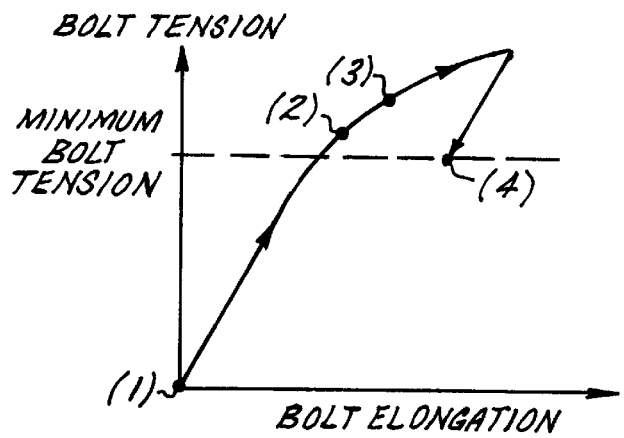
FIG. 12 is a graph bolt tension versus bolt elongation when using the direct tension indicating and maintaining washer shown in FIG. 5.

FIG. 11 is a graph of bolt tension versus bolt elongation for a bolt/nut assembly using the conventional direct tension indicating washer 10 shown in FIG. 1. As the bolt is tightened, the bolt tension and the bolt elongation increase as shown in FIG. 11 until the bolt installer is satisfied that the proper tension is achieved at point A. Bolt elongation refers to the increase in bolt length due to tension on the bolt. As shown in FIG. 11, any reduction in the bolt elongation (due to vibration, temperature, etc.) will cause the bolt tension to tend to decline until ultimately, the bolt tension is zero or close to zero (point B). FIG. 12 is a graph of bolt tension versus bolt elongation for a bolt/nut assembly using the direct tension indicating washer 30 shown in FIG. 5. As the bolt is tightened, the bolt tension and the bolt elongation increase as shown in FIG. 12 until the bolt installer is satisfied that the proper tension is achieved at point A. The numerals 1–4 in FIG. 12 correspond to states 1–4 illustrated in FIGS. 7–10. Subsequently, any decrease in bolt elongation will cause a reduction in bolt tension (from A to a minimum level). However, the bolt tension will be maintained at a minimum level 4 by the force applied by virtue of the resilient nature of the direct tension indicating washer 30.

Figure 13:
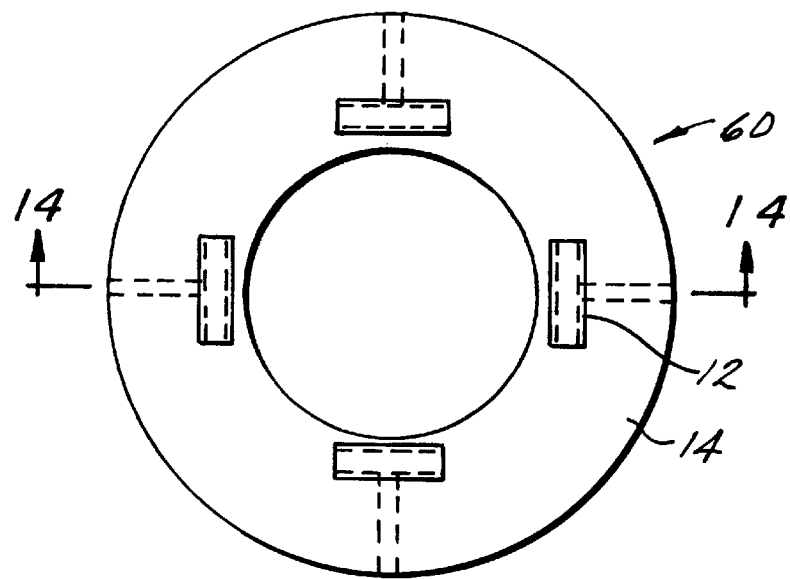
FIG. 13 is a top view of direct tension indicating washer in an alternative embodiment of the invention.
Figure 15:
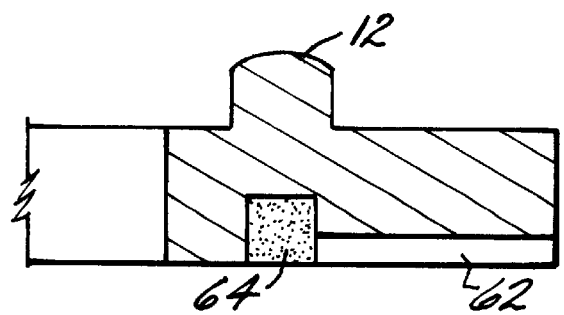
FIG. 15 is an enlarged view of a portion of the direct tension indicating washer of FIG. 14.

FIG. 13 is a top view of a direct tension indicating washer 60 in an alternative embodiment of the invention. The direct tension indicating washer 60 is similar to the direct tension indicating washer 10 shown in FIG. 1 in that protuberances 12 are formed on a first surface 14 and corresponding indentations 16 are formed on a second surface 18. The direct tension indicating washer 60 also includes channels 62 that lead from each indentation 16 to the outer diameter of the direct tension indicating washer 60. The indentation 16 is filled with an indicating material 64 as shown in detail in FIG. 15. The direct tension indicating washer 60 is manufactured in a process similar to the direct tension indicating washer 30. A tool and die are used to stamp the protuberances 12, indentations 16 and channels 62 into a blank washer. Other processes, such as metal machining or metal casting may be used to form the direct tension indicating washer 60. In all cases, the metal product will be heat treated by quenching and tempering after forming to produce the required spring-like load/deformation properties. In an exemplary embodiment, the direct tension indicating washer 60 is made from carbon steel, but stainless steel, nonferrous metals, and other alloy products may also be used. The indicating material 64 is an extrudable, elastomeric solid material such as colored silicone.

Figure 16:
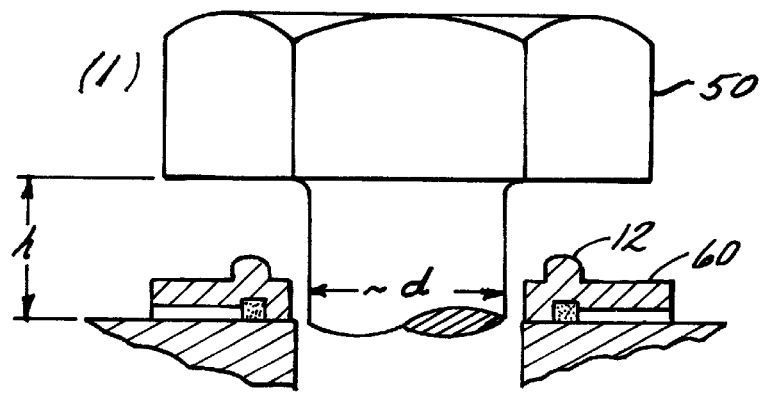
FIG. 16–21 illustrate the state of the direct tension indicating washer of FIG. 13 during the installation process.
Figure 17:
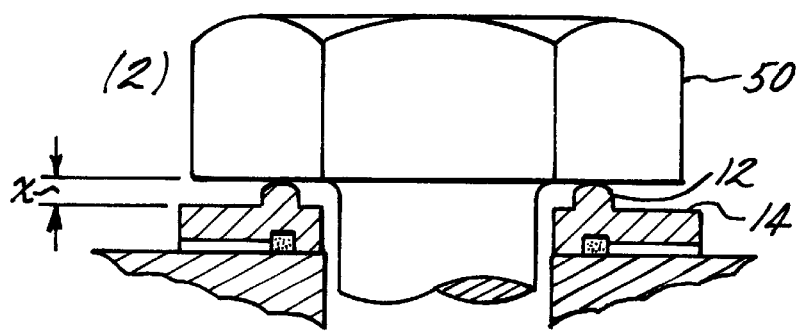
Figure 18:
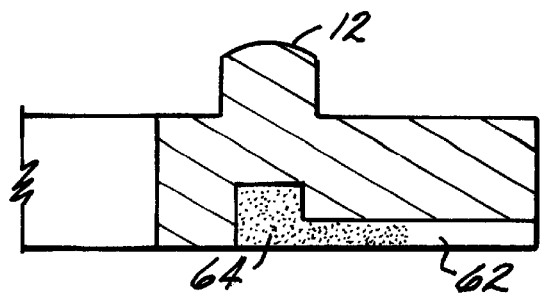

FIGS. 16–21 illustrate the state of the direct tension indicating washer 60 as a bolt 50 is tightened on the direct tension indicating washer 60. As shown in FIG. 16, the bolt is placed through an opening in the center of the direct tension indicating washer 60. This state is identified as stage 1 in FIG. 16. As the bolt 50 is tightened, the bottom of the bolt head contacts the protuberances 12 and begins to compress the protuberances towards the first surface 14 as shown in FIG. 17. FIG. 18 is an enlarged view of one of the indentations 16 illustrating that the force exerted by the protuberance 12 on the indicating material 64 forces the indicating material into channel 62. This state is identified in FIG. 17 as stage 2.

Figure 19:
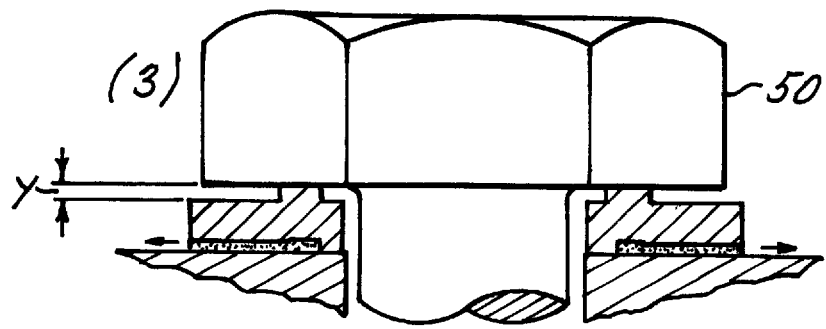
Figure 20:
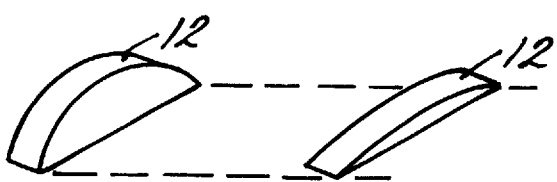
Figure 21:
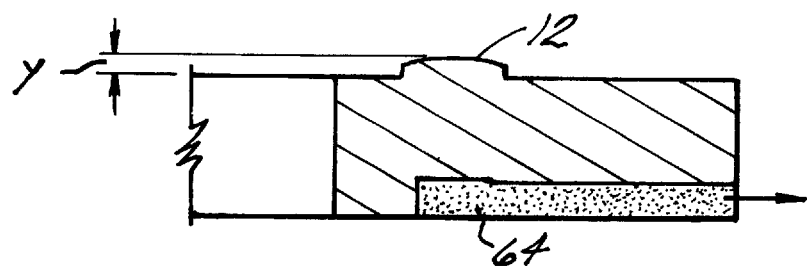

FIG. 19 illustrates the state of the direct tension indicating washer 60 when the bolt 50 has been tightened to a predetermined tension. When the desired bolt tension is achieved, the protuberances 12 have been compressed into the indentations 16 by a distance sufficient to force the indicating material 64 completely through the channel 62 so that the indicating material 64 appears at the outer diameter of the direct tension indicating washer 60. FIG. 20 shows the change in volume of the protuberances 12 from stage 1 to stage 3. The change in volume of the protuberances 12 is calibrated to the volume of channel 62. FIG. 21 is an enlarged view of one of the protuberances 12 and the channel 62 when the predetermined bolt tension has been achieved. As shown in FIG. 21, the indicating material 64 has been forced through the channel 62 and exits the channel at the outer diameter of the direct tension indicating washer 60.

Figure 14:
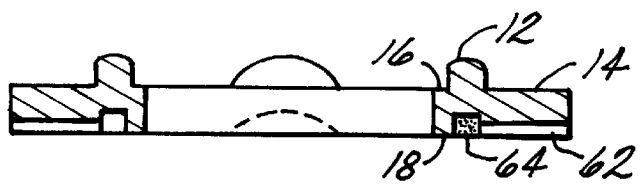
FIG. 14 is a cross-sectional view taken along line 14—14 of FIG. 13.
Figure 22:
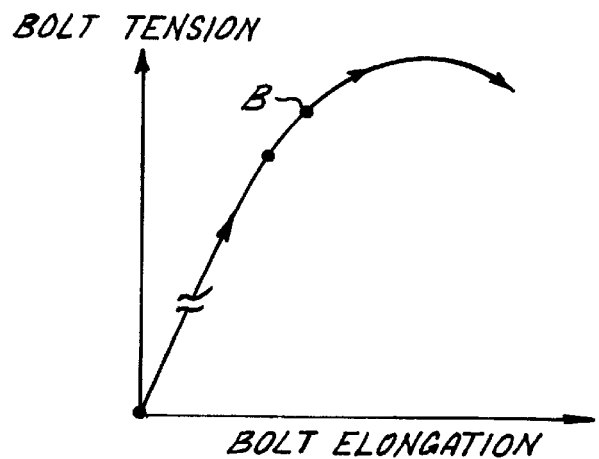
FIG. 22 is a graph of bolt tension versus bolt elongation when using the conventional direct tension indicating washer shown in FIGS. 1–2.
Figure 23:
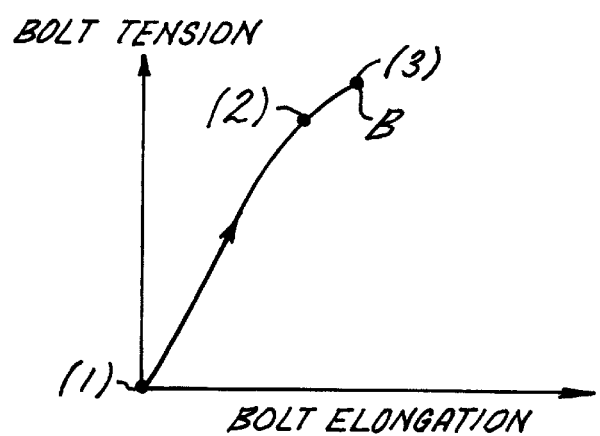
FIG. 23 is a graph bolt tension versus bolt elongation when using the direct tension indicating washer shown in FIG. 13.

FIG. 22 is a graph of bolt tension versus bolt elongation when using a convention direct tension indicating washer such as that shown in FIG. 1. The desired bolt tension is shown at point B. The bolt installer, however, has no indication that the desired bolt tension has been reached and continues to tighten the bolt past the desired bolt tension B. FIG. 23 is a graph of bolt tension versus bolt elongation when using the direct tension indicating washer 60 shown in FIGS. 13–14. The numerals 1–3 on the graph of FIG. 23 correspond to stages 1–3 shown in FIGS. 16–21. When the desired bolt tension is achieved at point B, the indicating material 64 will appear at the outer diameter of the direct tension indicating washer 60 and the bolt installer knows to discontinue tightening of the bolt. If the extruded indicating material has worn away over time, and confirmation of bolt tension is needed, a feeler gage may be used to confirm adequate bolt tension as shown in FIG. 1A.

Figure 24:
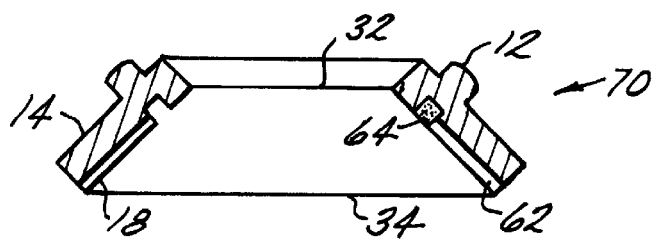
FIG. 24 is a cross-sectional view of a direct tension indicating and maintaining washer in yet another embodiment of the invention.

FIG. 24 is a cross sectional view of another embodiment of the invention. The direct tension indicating washer 70 in FIG. 24 combines the features of direct tension indicating washer 30 and direct tension indicating washer 60 described above. Accordingly, the direct tension indicating washer 70 both maintains tension by using a conical washer body but also includes the channel 62 and indicating material 64 for immediate detection of the proper bolt tension. The inner diameter edge 32 lies in a plane different than the plane of the outer diameter edge 34.

The present invention provides washers that maintain bolt tension and/or provide an immediate visual indication that the proper bolt tension has been achieved. A resilient quality is provided to a direct tension indicating and maintaining washer by positioning an inner diameter edge and an outer diameter edge in different planes. This resiliency maintains tension on the bolt even if vibration, temperature, etc. cause a decrease in bolt elongation. The use of indicating material positioned in indentations formed opposite protuberances, and a channel for directing the indicating material to the outer diameter of the direct tension indicating and maintaining washer, provides the bolt installer with an immediate visual confirmation that the proper bolt tension has been achieved. These improvements may be combined in a single direct tension indicating and maintaining washer.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating and maintaining washer comprising:
    a first surface having at least one protuberance formed thereon for indicating bolt tension;
    a second surface having at least one indentation formed opposite said protuberance;
    an opening having an inner diameter wall, said inner diameter wall meeting said second surface at an inner diameter edge;
    an outer diameter wall meeting said second surface at an outer diameter edge;
    wherein said inner diameter edge and said outer diameter edge lie in different planes, said first surface and said second surface being planar and defining a frusto-conical shape for maintaining tension on a bolt upon installation.

2. The direct tension indicating and maintaining washer of claim 1 wherein said direct tension indicating washer is conical.

3. The direct tension indicating washer of claim 1 further comprising an indicating material positioned within said indentation and a channel formed in said second surface leading from said indentation to said outer diameter edge.

4. A direct tension indicating washer comprising:
    a first surface having at least one protuberance formed thereon for indicating bolt tension;
    a second surface having at least one indentation formed opposite said protuberance;
    an indicating material positioned in said indentation; and
    a channel formed in said second surface leading from said indentation to an outer diameter of said direct tension indicating washer,
    wherein said first surface and said second surface being planar and defining a frusto-conical shape for maintaining tension on a bolt upon installation.

* * * * *

UNITED STATES PATENT AND TRADEMARK OFFICE
CERTIFICATE OF CORRECTION

PATENT NO. : 5,769,581
DATED : June 23, 1998
INVENTOR(S) : Ivan Wayne Wallace, et al It is certified that error appears in the above-identified patent and that said Letters Patent is hereby corrected as shown below:

Column 2, line 7 delete "in elastically" insert --inelastically--.
Column 2, line 65 insert --of-- between "graph" and "bolt".
Column 3, line 13 insert --of-- between "graph" and "bolt".
Column 5, line 46 delete "convention" insert --conventional--.

Signed and Sealed this

Twenty-eighth Day of March, 2000

Attest:

Q. TODD DICKINSON

*Attesting Officer*  *Commissioner of Patents and Trademarks*